Nov. 29, 1932.  G. A. MITCHELL  1,889,260
HANDLE MOUNTING FOR CAMERA TILTING HEADS
Filed June 9, 1931
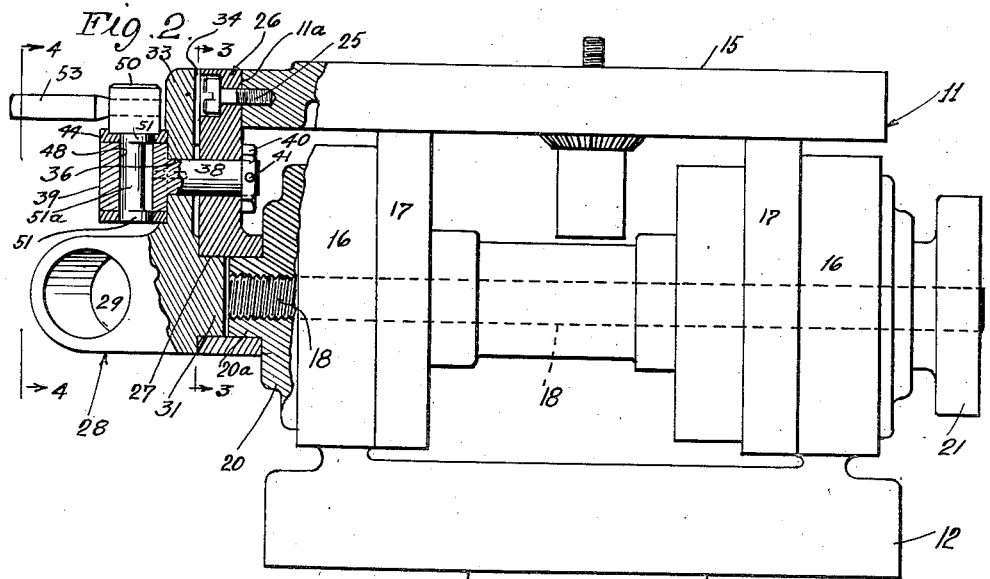
Inventor.
George. A. Mitchell.
Attorney.

Patented Nov. 29, 1932

1,889,260

UNITED STATES PATENT OFFICE

GEORGE A. MITCHELL, OF WEST HOLLYWOOD, CALIFORNIA, ASSIGNOR TO MITCHELL CAMERA CORPORATION, OF WEST HOLLYWOOD, CALIFORNIA, A CORPORATION OF DELAWARE

HANDLE MOUNTING FOR CAMERA TILTING HEADS

Application filed June 9, 1931. Serial No. 543,109.

This invention relates generally to handle mountings for tilting heads used for the mounting of such instruments as motion picture cameras; and it may be stated as a general object of the invention to provide an improved handle mounting which is easily and quickly adjustable to position, and further which permits the handle to be quickly swung to an inoperative position where it is entirely out of the way of the operator.

As is well known, tilting heads for motion picture cameras involve a head which is rotatable in a horizontal plane on a tripod head to permit "panning" movement, and which has a horizontal pivot permitting the camera to be tilted up or down through a small angle. For the purpose of moving the camera to follow moving objects, the tilting head is commonly provided with a handle bar of sufficient length to permit easy and steady movement. This handle bar usually extends rearwardly from the camera, and when not in use is very bothersome to the cameraman. The present invention provides an improved handle mounting, so arranged that a simple unclamping operation permits the handle to fall and hang straight downwardly where it is entirely out of the way.

The various objects and features of the invention will best be understood without further preliminary discussion from the following detailed description of a present preferred embodiment thereof, reference for this purpose being had to the accompanying drawing, in which:

Fig. 1 shows a camera mounted on a tilting head equipped with my improved handle mounting;

Fig. 2 is an elevation of the tilting head, parts being broken away to show the handle mounting in section;

Fig. 3 is a section taken as indicated by line 3—3 of Fig. 2; and

Fig. 4 is a detail taken as indicated by line 4—4 of Fig. 2.

In Fig. 1 of the drawing numeral 10 designates generally a motion picture camera supported on a tilting head 11, which head has a base 12 rotatably mounted in the usual manner on the head of the tripod 14. In Fig. 2 the tilting head is shown to have a table 15 to which the camera body may be fastened down. Extending upwardly from base 12 is a pair of brackets 16, which brackets take between them a pair of brackets 17 depending from table 15, a spindle 18 running horizontally through the brackets to furnish a pivotal mounting for the table on a base, as will readily be understood from the drawing. Nut members 20 and 21 screwed on the ends of spindle 18 are set up to clamp the assembly together, but not too tight to prevent relative movement of the pairs of brackets.

The table 15 and camera mounted thereon are thus tiltable on the axis of spindle 18, and the tilting head is rotatable at base 12 on the head of the tripod for "panning" movement.

Secured as by screws 25 to the table edge 11a which is transverse with respect to the horizontal tilting axis of the tilting head, is a depending bracket 26, the lower end of which is drilled with a bore 27 concentric with spindle 18 and within which is received a round boss 20a projecting from nut 20. Thus as the camera tilts on the axis of spindle 18, bracket 26 pivots on boss 20a which is concentric with said axis, boss 20a thus bracing bracket 26 in all positions.

The handle bracket, generally designated at 28, has a socket 29 for the handle 30, and is formed opposite said socket with a round boss 31 received and adapted to rotate within bore 27 of bracket member 26, bracket 28 thus being pivoted to bracket 26 on the horizontal axis of the tilting head. Extending upwardly from bracket 28 adjacent bracket 26 is a plate 33, and the adjacent faces of said bracket plate 33 and bracket 26 are formed with interengaging teeth 34, so that bracket 28 may be rotated in bore 27 to adjust its relation to fixed bracket 26, and then clamped thereto, as hereinafter described, said teeth thereupon engaging and locking the brackets against relative movement.

Bracket 26 has opposite plate 33 an arcuate slot 35 struck from the axis of bore 27 as a center (see Fig. 3), and opposite said slot there is provided in plate 33 a drill hole 36.

Extending through said drill hole 36 and arcuate slot 35 is a clamping shaft 38, the outer end of which has a cylindrical head 39 adjacent the outer surface of plate 33, and the inner end of which is screw-threaded to take a nut 40, said nut forming a head engageable with bracket 26. Nut 40 is set up loosely so as to permit the interengaging bracket teeth 34 to clear when shaft 38 is not clamped, and is fastened against rotation on screw 38 as by key 41. Fitted for relative longitudinal movement on cylindrical shaft head 39 is a sleeve 44, said sleeve coming against the outer surface of plate 33 and being held against rotation by means of a dowel pin 45 set into plate 33. A transverse bore 48 is drilled through sleeve 44 and head 39, and fitted therein is a cam stud comprising a head 50 resting on a flattened surface on sleeve 44, and a reduced part 51 extending through bore 48. Said part 51 fits bore 48 nicely in sleeve 44, but is formed with a reduced eccentric cam section 51a within shaft head 39, as will be readily apparent from Fig. 2. The head 50 of the cam stud is provided with a manually operable lever 53 by means of which the stud may be conveniently rotated.

It will be evident that when the cam stud is in the position illustrated in Fig. 2, its eccentric section 51a pulls clamping shaft head 39 outwardly and forces the inner edges of sleeve 44 inwardly against bracket plate 53, which results in bracket plate 33 and bracket 26 being clamped together by shaft 38 between nut 40 and sleeve 44. By rotating the cam stud from the position shown in Fig. 2, its eccentric section relieves the pull on shaft 38 sufficiently to permit the teeth 34 between brackets 26 and 28 to clear, and bracket 28 may then be rotated in bore 27 to change the position of the handle, shaft 28 moving in arcuate slot 35 with such movement. The cam stud may then be rotated to again tighten the clamp and bring the toothed faces of the bracket plates tightly together. With the brackets thus clamped, arm 30 extends rearwardly, as shown in full lines in Fig. 1, and the tilting head may be freely moved thereby. It will be observed that the handle mounting furnishes a pivot or fulcrum for the handle on the horizontal tilting axis of the head, and furnishes a lever arm (bracket plate 33) for tilting movement of the head equal to the distance from said pivot axis to the interengaging teeth 34.

Arcuate slot 35 is made sufficiently long that when the handle is not in use, the handle bracket may be rotated through approximately 90° to permit the handle to hang straight downwardly where it is entirely out of the way, as shown in dotted line in Fig. 1. The socket 29 in the handle bracket is outwardly inclined by a small angle, as may be seen in Figs. 2 and 4, so that the handle bar entirely clears the tripod legs in this hanging position. This arrangement is of considerable convenience to the cameraman, since he can clamp the handle at a convenient operating position with a simple short turn of the cam stud, and by a reverse turn the handle is unclamped and falls to a position entirely out of the way.

It will be understood the drawing and description are to be considered merely as illustrative of and not restrictive on the broader claims appended hereto, for various changes in design, structure and arrangement may be made without departing from the spirit and scope of said claims.

I claim:—

1. In combination with a movable camera-carrying head, a handle mounting comprising a bracket secured to said head, a handle bracket horizontally pivoted to the first mentioned bracket, said handle bracket having a socket for a handle bar, a handle bar mounted in said socket, a clamping shaft offset from the pivot axis of said brackets and passing through an aperture in one bracket and an arcuate slot in the other bracket struck from the center of said pivot axis, said arcuate slot being of a length to permit the handle bracket to be moved between a position in which the handle extends horizontally and a position in which the handle bar hangs substantially straight downwardly, and clamping means cooperating with said clamping shaft to clamp the brackets against relative movement.

2. In combination with a movable camera-carrying head mounted on a tripod, a handle mounting comprising a bracket secured to said head, a handle bracket horizontally pivoted to the first mentioned bracket, said handle bracket having a handle bar socket, a handle bar mounted in said socket, clamping means for locking said brackets against relative pivotal movements in relative positions removed from each other substantially by ninety degrees, so that the handle bar may be substantially horizontal or hang down substantially vertically, and the handle bar socket being outwardly inclined so that the handle bar clears the tripod legs when in said downwardly hanging position.

3. In combination with a tilting head having a horizontal pivot axis, a handle mounting comprising a bracket secured to said head, a handle bracket pivoted to said first mentioned bracket on an axis concentric with the horizontal pivot axis of the tilting head, said handle bracket having a socket for a handle bar, a clamping shaft offset from the pivot axis of said brackets and passing through an aperture in the handle bracket and an arcuate slot in the other bracket struck from the center of said pivot axis, said arcuate slot being of a length to permit the handle bracket to be moved between a position in which the handle extends horizontally and a position in which the handle hangs substantially straight downwardly, and clamping means cooperating with said clamping shaft to clamp the bracket against relative movement.

4. In combination, a relatively stationary plate, a relatively movable plate pivoted to said stationary plate, and clamping means for said plates comprising a clamping shaft passing through an aperture in one plate and an arcuate slot in the other plate struck from the pivot axis of the plates, a head on one end of the shaft engaging the outer surface of the corresponding plate, a cylindrical head on the other end of the shaft, a sleeve longitudinally movable on said cylindrical head and engaging the outer surface of the corresponding plate, and a manually operable cam stud passing through a bore extending transversely through said sleeve and cylindrical head, said cam stud having an eccentric section within said cylindrical head.

5. In combination, a relatively stationary plate, a relatively movable plate pivoted to said stationary plate, and clamping means for said plates comprising a clamping shaft passing through an aperture in one plate and an arcuate slot in the other plate struck from the pivot axis of the plates, a head on one end of the shaft engaging the outer surface of the corresponding plate, a clamping member longitudinally slidable on the other end of the shaft and engaging the outer surface of the corresponding plate, and a manually operable cam stud passing through a bore extending transversely through said clamping member and shaft end, said cam stud adapted to cause relative longitudinal movement between said shaft and clamping member.

6. In combination with a movable camera-carrying head, a handle mounting comprising a bracket secured to said head, a handle bracket horizontally pivoted to the first mentioned bracket, said handle bracket having a socket for a handle bar, a clamping shaft offset from the pivot axis of said brackets and passing through an aperture in one bracket and an arcuate slot in the other bracket struck from the center of said pivot axis, a head on one end of shaft engaging the bracket secured to the head, a cylindrical head on the other end of the shaft, a sleeve longitudinally movable on said cylindrical head and engaging the outer surface of the handle bracket, and a manually operable cam stud passing through a bore extending transversely through said sleeve and cylindrical head, said cam stud having an eccentric section within said cylindrical head.

7. In combination with a movable camera-carrying head, a handle mounting comprising a bracket secured to said head, a handle bracket horizontally pivoted to the first mentioned bracket, said handle bracket having a socket for a handle bar, a clamping shaft offset from the pivot axis of said brackets and passing through an aperture in one bracket and an arcuate slot in the other bracket struck from the center of said pivot axis, a head on one end of the shaft engaging the bracket secured to the head, a clamping member longitudinally slidable on the other end of the shaft and engaging the outer surface of the handle bracket, and a manually operable cam stud passing through a bore extending transversely through said clamping member and shaft end, said cam stud adapted to cause relative longitudinal movement between said shaft and clamping member.

In witness that I claim the foregoing I have hereunto subscribed my name this 1st day of May, 1931.

GEORGE A. MITCHELL.